United States Patent [19]

Fischer et al.

[11] Patent Number: 4,512,882
[45] Date of Patent: Apr. 23, 1985

[54] SINGLE-ENDED, SPIN-ON FUEL WATER SEPARATOR

[75] Inventors: Paul M. Fischer, Menomonie, Wis.; Carl E. Schwarz, Burnsville, Minn.

[73] Assignee: Donaldson Company, Inc., Minneapolis, Minn.

[21] Appl. No.: 543,060

[22] Filed: Oct. 18, 1983

[51] Int. Cl.$^3$ .................................................. B01D 35/18
[52] U.S. Cl. ........................................ 210/86; 210/90; 210/183; 210/184; 210/187; 210/232; 210/313; 210/416.4; 210/440; 210/DIG. 5; 210/DIG. 17; 123/549; 123/557
[58] Field of Search ............... 210/184, 185, 186, 85, 210/86, 90, 104, 114, 440, 238, DIG. 17, 243, 183, 182, 187, 311, 312, 313, 232, DIG. 5, 416.4; 123/549, 557; 340/607, 611, 620; 55/213, 215, 274

[56] References Cited

U.S. PATENT DOCUMENTS

| | | | |
|---|---|---|---|
| 2,693,281 | 11/1954 | Winzen | 210/165 |
| 2,770,362 | 11/1956 | Paquin | 210/DIG. 5 |
| 2,772,409 | 11/1956 | Reid | 340/611 |
| 2,907,121 | 10/1959 | Yelinek et al. | 35/13 |
| 3,020,950 | 2/1962 | Schraivogel | 210/172 |
| 3,072,258 | 1/1963 | Saxby | 210/94 |
| 3,103,042 | 9/1963 | Roosa | 210/94 |
| 3,117,233 | 1/1964 | Mittelberger et al. | 210/86 |
| 3,122,501 | 2/1964 | Hultgren | 210/94 |
| 3,129,891 | 4/1964 | Vdoviak | 239/405 |
| 3,186,549 | 6/1965 | Batstiber | 210/86 |
| 3,192,691 | 7/1965 | Ely | 55/325 |
| 3,199,676 | 8/1965 | May | 210/114 |
| 3,214,020 | 10/1965 | Danker | 210/108 |
| 3,237,769 | 3/1966 | Humbert, Jr. | 210/94 |
| 3,237,770 | 3/1966 | Humbert, Jr. | 210/94 |
| 3,273,716 | 9/1966 | Kennepohl | 210/120 |
| 3,295,684 | 1/1967 | Webb | 210/314 |
| 3,297,160 | 1/1967 | Humbert, Jr. | 210/94 |
| 3,298,522 | 1/1967 | Muller | 210/90 |
| 3,300,053 | 1/1967 | Peters | 210/519 |
| 3,306,456 | 2/1967 | Fromson et al. | 210/256 |
| 3,322,280 | 5/1967 | Taylor | 210/94 |
| 3,333,258 | 7/1967 | Walker et al. | 340/620 |
| 3,362,534 | 1/1968 | Kay | 210/84 |
| 3,368,681 | 2/1968 | Kasten | 210/114 |
| 3,369,666 | 2/1968 | Hultgren et al. | 210/130 |
| 3,385,447 | 5/1968 | Bergstrom | 210/360 |
| 3,386,581 | 6/1968 | Gough | 210/86 |
| 3,389,801 | 6/1968 | Sieger | 210/135 |
| 3,399,975 | 9/1968 | Otten | 23/301 |
| 3,409,135 | 11/1968 | Bradley et al. | 210/136 |
| 3,428,180 | 2/1969 | Rogers | 210/311 |
| 3,434,486 | 3/1969 | Kasten | 137/67 |
| 3,465,883 | 9/1969 | Jumper | 210/307 |
| 3,502,218 | 3/1970 | Tuffnell et al. | 210/305 |
| 3,505,663 | 4/1970 | Yule | 340/663 |
| 3,520,417 | 7/1970 | Durr et al. | 210/493 |
| 3,550,776 | 12/1970 | Hamilton | 210/94 |
| 3,568,658 | 4/1970 | McVay | 210/DIG. 5 |
| 3,588,835 | 3/1971 | Hansen | 210/86 |
| 3,591,004 | 7/1971 | Roosa | 210/94 |
| 3,678,881 | 7/1972 | Shinn | 210/90 |
| 3,710,949 | 1/1973 | Murkes | 287/53 R |
| 3,800,948 | 4/1974 | La Vallee | 210/136 |
| 3,805,958 | 4/1974 | Campbell | 210/136 |
| 3,809,244 | 5/1974 | Jackson | 210/94 |
| 3,830,368 | 8/1974 | Rogers | 210/94 |
| 3,841,484 | 10/1974 | Domnick | 210/95 |

(List continued on next page.)

Primary Examiner—Ernest G. Therkorn
Attorney, Agent, or Firm—Merchant, Gould, Smith, Edell, Welter & Schmidt

[57] ABSTRACT

A spin on fuel water separator having a filter element attached within an electrically grounded housing, a circuit (50) is provided for supplying an electrical potential to the filter element and the filter element is electrically insulated from the housing. Separated water is stored within the housing, and when separated water accumulates within the housing so as to contact the filter element, a current flow through the filter element, the water in the reservoir and the housing is indicated. An optional embodiment includes a pressure drop detector for detecting and indicating a restricted filter element.

8 Claims, 4 Drawing Figures

U.S. PATENT DOCUMENTS

| | | | |
|---|---|---|---|
| 3,868,322 | 2/1975 | Orloff | 210/108 |
| 3,897,342 | 7/1975 | Schmid et al. | 210/445 |
| 3,915,858 | 10/1975 | Condolios | 210/85 |
| 3,915,860 | 10/1975 | Priest | 210/130 |
| 3,931,011 | 1/1976 | Richards et al. | 210/136 |
| 4,017,397 | 4/1977 | Copeland | 210/238 |
| 4,021,342 | 5/1977 | Schacht et al. | 210/94 |
| 4,035,295 | 7/1977 | Pluequet | 210/136 |
| 4,053,405 | 10/1977 | DeKeyser et al. | 210/86 |
| 4,065,392 | 12/1977 | Gammon | 210/282 |
| 4,081,373 | 3/1978 | Rozniecki | 210/114 |
| 4,126,557 | 11/1978 | Hodgkins | 210/249 |
| 4,144,168 | 3/1979 | Thornton | 210/130 |
| 4,145,285 | 3/1979 | Martin et al. | 210/100 |
| 4,187,136 | 2/1980 | Nostrand | 156/192 |
| 4,246,109 | 1/1981 | Manders | 210/90 |
| 4,251,369 | 3/1981 | Casad et al. | 210/104 |
| 4,253,954 | 3/1981 | Midkiff et al. | 210/168 |
| 4,257,890 | 6/1981 | Hurner | 210/112 |
| 4,272,368 | 6/1981 | Foord et al. | 210/90 |
| 4,276,161 | 6/1981 | Matsui | 210/86 |
| 4,276,162 | 6/1981 | Wilson | 210/94 |
| 4,278,550 | 7/1981 | Watts | 210/741 |
| 4,298,465 | 11/1981 | Druffel | 210/304 |
| 4,303,422 | 12/1981 | Dersinger | 55/319 |
| 4,372,847 | 2/1983 | Lewis | 210/86 |

SINGLE-ENDED, SPIN-ON FUEL WATER SEPARATOR

TECHNICAL FIELD

The present invention relates to apparatus used for separating fluids of different specific gravities and more particularly to an apparatus for removing water and associated bacteria from diesel fuel in order to purify the fuel for use in an engine.

BACKGROUND OF THE INVENTION

Devices for removing particulate contaminants from motor fuel are known in the art, and include gasoline fuel filters as well as diesel fuel filters. Principally these devices are designed to remove particles from the fuel to prevent the contaminants from entering the engine, and in the case of a diesel engine to prevent the contaminant from obstructing the fuel injectors of the common diesel engine.

Further, it is known that water sometimes finds its way into fuel storage tanks and tanks mounted on vehicles. Often, this water is removed by providing a drain bowl at the lowest point in the fuel line, or at the lowest point in the fuel tank. Water is then periodically drained from this fuel bowl to remove the water from the fuel. Fuel bowls have the disadvantage of typically being located in a portion of the vehicle which is difficult to reach, as the fuel bowl must be located at the lowest point of travel of the fuel line. Also, the operator is typically unaware that the bowl contains separated water unless a visual inspection is made. Visual inspections are often ignored and are hampered by the inevitable accumulation of dirt and grime on the outside of the bowl making an accurate inspection difficult. The problems associated with water in engine fuel have been known for many years. Unfortunately, since no warning mechanism alerted the operator when the bowl was fill of water, most engines were operated with the bowl full and water reaching the engine from time to time. Misfiring, rough operation and severe engine damage often resulted.

Other techniques for removing water from fuel include the use of additives to the fuel which allow the water to mix with the fuel and be successfully burned by the engine. These additives have the disadvantage of being expensive and requiring the additional step of combining the additive with the fuel.

Today, with the increased use of diesel engines for motor vehicles including heavy duty trucks and common passenger automobiles, as well as the continued use of diesel engines in stationary locations such as for generators and water irrigation systems, the need for purified diesel fuel has increased. Also, the amount of water and bacterial contaminants found in diesel fuel has increased in recent years. This problem is especially acute in remote areas and in underdeveloped regions of the world.

The growth of bacteria in diesel fuel contaminated with water, is a serious problem. This bacteria forms a gelatinous scum or film which greatly impairs the efficient functioning of the modern diesel engine. Removal of this bacteria can be accomplished by draining water from a fuel bowl. Additionally, an antibacterial agent or bacteria killing compound can be added to the fuel. Antibacterial agents have the disadvantage of being expensive and requiring the additional step of adding the agent to the fuel.

Devices for separating water from fuel are known in the art. U.S. Pat. No. 4,017,397 issued Apr. 12, 1977 to Copeland is an example of a filter device which allows separated water to be removed from a filter type device. The Copeland device is an example of a type of fuel water separator which is characterized by the following disadvantage: the level of water present in the separator is not automatically reported to the operator. A glass bowl or other device is therefore required, and manual inspection of the device at regular intervals is necessary to determine when water should be removed from the device. The inspection of such a device is inconvenient and may be hindered by the accumulation of dirt or oily substances on the outside of the glass bowl.

U.S. Pat. No. 4,276,161 issued June 30, 1981 to Matsui, et al. is an example of a fuel filter of the type provided with a water level detecting means. In the Matsui device a fuel filter has an electrode at the bottom part of a casing forming a detecting gap with the metal body of the casing. When separated water reaches a predetermined level, a low resistance condition between the electrode and the casing is detected. The Matsui device is an example of the type of device which has electric wiring passing into the filter at its lowermost point. This type of device has the disadvantage of requiring removal of the wiring to change the filter element, running the risk of tangling or severing the wires. Another disadvantage of having wiring entering the filter at the lowest point of the filter center is the degenerative effect petrochemical distillates have on rubber based wiring insulation. Should the insulation on the wiring become frayed or cracked, a short circuit and erroneous reading could result. The use of non-rubber based insulation can typically overcome this problem, but these compounds may be inflexible at low temperatures which may complicate the changing of the filter elements.

These and other disadvantages of the devices known in the prior art leave room for improvement in the field of fuel purification and contaminant removal. Consequently, there is a need for an improved fuel water separator allowing efficient separation of water and associated bacterial contaminants from fuel. Simplified removal of the separated water from the device, along with easy removal of air pockets or voids within the device and a simple to operate automatic water level detection mechanism which does not hinder the removal and replacement of the filter cartridge is required. Further, a fuel separator having the ability to alert the operator of a high restriction condition within the device is required.

As the quality of available fuel has decreased, the useful life of filter elements has also tended to decrease. As the filter elements become dirty with foreign matter, the passage of fuel through the filter is impeded. Most engine manufacturers require that fuel filters be replaced at scheduled intervals to prevent engine damage. The damage done to an engine by operation with contaminated fuel is well known, but the exact useful life of a filter element has heretofore been difficult to determine.

As the amount of foreign matter found in fuel can vary widely between sources of supply, a vehicle operated over the road may acquire a load of "bad fuel" at certain locations, thus accelerating the accumulation of foreign matter in the fuel filter. This condition may be aggravated in engines operated off of the highway as in these locations the storage facilities for fuel may be primitive. Therefore, simply replacing the fuel filter at regular intervals may result in the operation of an engine with a badly restricted filter or may result in the disposal of a filter which still has significant useful life.

Indication of the state of restriction of the filter element has been attempted in the past. One common solution has been to place a visual restriction indicator on the head of the fuel separator or oil filter. An example of this type of device would be a glass tube with a sliding piston inside, wherein the ends of the tube are exposed to the vacuum drop across the filter element. Movement of the piston indicates a certain vacuum drop. The problems described above with respect to visual inspection of water levels apply to the visual inspection of this type of device. For example, grease or dirt may cover the tube making a reading difficult. Further, the engine must be in operation for the common restriction indicator to be operable, as a vacuum drop across the filter is only present during engine operation.

In a vehicle having such a restriction indicator, the operator must usually leave the controls of the vehicle, with the engine running, to inspect this type of device. This may present serious safety concerns for the operator and the vehicle. Therefore, there has long been a need for a fuel separator which will detect and indicate to the operator when a fuel filter element becomes unsatisfactorily restricted. There is particularly a need for a filter restriction indicator which will immediately report to the operator should the filter element become clogged during operation of the engine, with the restriction condition indicated to the operator even if the operator is located remotely from the engine.

SUMMARY OF THE INVENTION

The present invention includes a device for separating fuel and water from a mixture thereof, and detecting the presence of a certain volume of separated water within a device. The device has an electrically conductive first member or head equipped with inlet and outlet ports for receiving and releasing the mixture of fuel and water, and separated fuel respectively. An electrically conductive lower or second member having a mixture inlet, a fuel outlet and lowermost portion is provided. The mixture inlet and fuel outlet are in fluid communication with the inlet and outlet of the head. The fuel/water separating element is secured within the second member and electrically insulated therefrom. The separator element has an electrically conductive perforated sleeve in fluid communication with the fuel outlet. An electrical potential is provided to the electrically conductive sleeve of the separator element so that when separated water accumulates in the lower-most portion of the second member to a level sufficient to contact the electrically conductive sleeve of the separator element, an electrical circuit is completed and current will flow from the electrically conductive sleeve of the separator element to the electrically conductive second member which is grounded to the engine or vehicle.

Thus, a fuel water separator having automatic detection circuitry for detecting a predetermined volume of separated water is disclosed. A warning light can be provided in the circuit along with a transistor and resistors to indicate to the operator that the predetermined amount of water has accumulated in the separator. The warning light indicates the accumulated water detected by the circuit. Removal of the separated water through a drain vent or drain cock in the lowermost portion of the separator is provided.

The electrical potential is provided to the electrically conductive sleeve through the center of the outlet port which passes vertically through the center of the head. An electrical contact spring is welded to the inner sleeve of the filter member. The filter housing or second member is spun on or threadably affixed to the head. The spring makes electrical contact with the electrical contact provided in the head. In this way, a spin-on type filter element is provided which allows simple removal and replacement of the filter element yet which allows automatic water level detection.

A second embodiment includes a restricted filter element detection circuit with an indication means located in the vicinity of the operator to alert the operator of the detected restriction condition.

DETAILED DESCRIPTION OF THE INVENTION

Figures 1, 2:
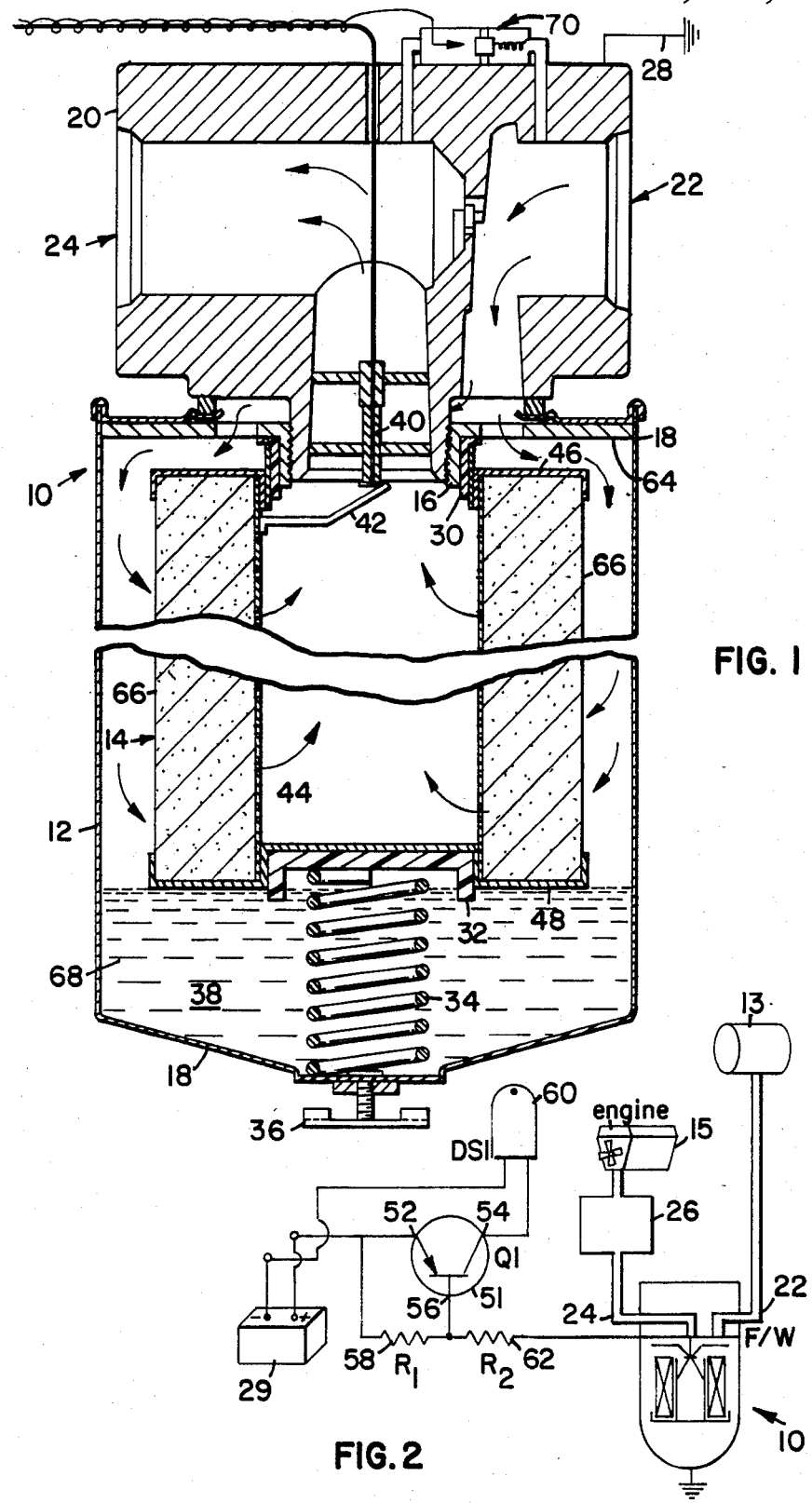
FIG. 1 is a cross-sectional view of a fuel-water separator incorporating the present invention.
FIG. 2 is a schematic view of the wiring incorporated in the preferred embodiment of the present invention.

In reference now to the drawings, wherein like reference numbers illustrate like or corresponding structures throughout the several views, FIG. 1 illustrates a cross-sectional view of the internal structure of the fuel-water separator 10. Separator 10 has a spin-on filter cartridge 12 having a filter element 14 attached within filter cartridge 12 at a point 16 within the filter housing 18. The housing 18 is electrically grounded as it is in electrical contact through the threads which allow the filter cartridge 12 to spin-on to the head 20 of the separator 10. The head 20 is typically affixed to a chassis of the vehicle or motor on which the separator is used, and is therefore effectively grounded through ground point 28 to the motor or vehicle.

The housing 18 includes a separated water reservoir 38 at the lower part of the housing 18. Water separated by the filter element 14 will naturally flow to the lowest point within the housing 18. This is caused by the difference in specific gravity between diesel fuel and water. Separated water can be removed from the separator through the drain cock 36.

The head 20 includes an inlet 22 which allows a mixture of fuel and water to enter the separator 10 and pass to the filter element located within the spin-on cartridge 12. Separated fuel passes through the element and returns to the head via fuel outlet 24. Inlet 22 and outlet 24 are passageways for the stream of fuel consumed by the engine.

Water is separated by the hydrophobic coating placed on the filter element 14, and travels to the separated water reservoir 38. Particulate matter and foreign substances are deposited on the filter element to be removed from the separator when the spin-on cartridge 12 is changed. This change can be made either at regularly scheduled intervals or when a restricted flow condition within the separator 10 is detected. (Detection of a restriction condition will be described below.)

The inlet 22 is a means for supplying a mixture of fuel and water to the separator, while the outlet 24 is a means for discharging separated fuel from the separator.

Typically in use, fuel is passed from a storage tank 13 to the fuel-water separator 10 by a fuel pump 26, prior to being pumped to the engine 15. See FIG. 2. The fuel pump 26 may also be placed between the tank 13 and the separator 10. See FIG. 3.

The fluid flow through the separator can be thought of as a stream of fluid passing from the inlet 22 to the cartridge 12, through the filter element 14 and out through the separated fuel outlet 24. The fuel inlet 22 corresponds to the upstream region of fluid flow, with the outlet 24 corresponding to the downstream region of fluid flow.

The fuel filter element 14 is positioned within the cartridge 12 by a support spring 34 held under compression between the bottom portion of the housing 18 and the bottom of the filter element 14. Support spring 34 holds the top end of the filter element 14 against the flange located within a perforated cartridge end plate 64. The filter element 14 is electrically insulated from the housing 18 by an insulator washer 30 located at the point of attachment of the element 14 within the housing 18, and an insulator cup 32. The insulator washer 30 and the insulator cup 32 define a first and a second surface within the housing 19. These surfaces are located where the filter element 14 is attached to the housing 18. The insulator washer 30 and the insulator cup 32 serve as nonconductive gaskets electrically insulating the filter element 14 from the housing 18 of the cartridge 12. This insulation means allows the filter element 14 to normally maintain an electrical potential which it receives from a battery 29 via an electrical contact 40 located within the head 20. This electrical potential is supplied to the electrical contact 40 through a wire or other means from the battery through a simple circuit. This circuit is described in detail below and is shown in FIG. 2. The electrical potential received at the electrical contact 40 is passed to the conductive inner sleeve 44 of the filter element 14 via a spring arm contact 42 in electrical contact with the inner sleeve 44.

The filter element 14 consists of a hydrophobically treated paper filter element 66 or the like which surround a generally cylindrical perforated inner sleeve 44. The filter element 14 further has a top end plate 46 which is generally disk-shaped and is placed against the point of attachment 16 of the filter element 14 within the housing 18. The insulator washer 30 is interposed between the top end plate and the cartridge end plate 64. The filter element 14 further contains a bottom end plate 48 which is connected at the opposite end of inner sleeve 44 from top end plate 46. Bottom end plate 48 receives insulator cup 32 which locates and retains support spring 34.

The top end plate 46 and the bottom end plate 48 are in electrical contact with the inner sleeve 44. Therefore, the electrical potential supplied to the inner sleeve 44 by spring arm contact 42 and electrical contact 40 is transferred to the bottom end plate 48. Since the filter cartridge 14 is electrically insulated from the housing 18, current will not flow between the cartridge 14 and the housing 18 unless a conductive material is present between the filter element 14 and the housing 18. Diesel fuel, and most oils in general, are effective insulators and will not conduct electricity. Should the separated water reservoir 38 contain a sufficient amount of water 68 to allow water to fill the reservoir 38 and rise to the level of bottom end plate 48, a conductive material would then be present between the filter element 14 and the housing 18.

Water is, of course, a relatively efficient conductor due to the presence of free ions in water which is not 100% pure. Typically, the water which would be separated from diesel fuel would contain sufficient free ions to allow current to flow therethrough.

Since the separated water accumulated within the reservoir 38 is in electrical contact with the metallic housing 18, if the water 68 accumulated within the reservoir rises to the level of the bottom end plate 48 (as shown in FIG. 1), current can flow between the filter element 14 through the water 68 to the ground 28 through the housing 18 and the head 28. Therefore, an indication of current flow through the system can indicate the accumulation of a predetermined level of separated water within the reservoir 38. This predetermined level is variable by adjusting the size of the reservoir by changing the length of the filter element 14 or the housing 18. The fuel water separator described above constitutes the preferred embodiment.

An optional embodiment of the present invention further involves detection of a high vacuum or pressure drop from the upstream to the downstream side of the filter element 14. A high vacuum or pressure drop would indicate a restriction in the fluid flow stream. This restriction could be caused by a clogged filter element 14. Detection and indication of a high restriction condition is important to prolong engine life by insuring that a clean filter is always provided. Further, an indication of a clogged filter can reduce the diagnosis time required to determine why an engine is functioning improperly due to fuel starvation. Also, by operating the separator until a constriction is detected allows the filter elements 14 to be used until their useful life is exhausted.

Figure 4:
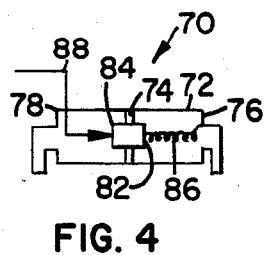
FIG. 4 is a partial cross-sectional view of a portion of a fuel-water separator incorporating the optional embodiment of the present invention.

A condition of restricted fuel flow due to a clogged filter element is detected in this optional embodiment of the present invention wherein a pressure drop detecting means is installed within the head 20 of the fuel-water separator 10. The pressure drop detector 70 includes a chamber 72 having a first end 76 and a second end 78. See FIG. 4. The first end 76 is associated with the upstream portion of the fuel flow, and the second end 78 is associated with the downstream portion of the fuel flow. Therefore, should a significant pressure drop be present in the fuel flow across the filter element 14, significantly different pressures will be present within chamber 72 between the first end 76 and the second end 78.

The respective ends of the chamber 72 are maintained at independent pressures by piston 74 which is biased toward the first end 76 of the chamber 72 by a piston spring 86. When the pressure drop across the filter element 14 is negligible, the piston will be near the first end 76 of the chamber 72. Should a severe restriction condition such as a clogged filter produce a high pressure drop across filter element 14, the piston will move toward the second end 78 of the chamber 72. An electrical touch point 88 is positioned within the chamber 72 near the second end 78 thereof. The touch point 88 is provided with an electrical potential from the power source or battery 29. Should the piston 74 make electrical contact with the touch point 88, a second electrical circuit is completed with current flowing from the touch point 88 to the piston 74, and through the piston spring 86 to the chamber 72 to the head 20 which is grounded through the ground point 28.

The second circuit includes a second indicating means such as a lamp 100 located distant from the separator, and near the location of the operator of the vehicle or engine. The touch point 88 is electrically insulated from the chamber 72 in a conventional manner and will, therefore, not permit a continuous current flow unless the touch point 88 is in contact with the piston 74. The piston 74 has a first face 82 facing toward the first end 76 of the chamber 72, and a second face 84 facing toward the second end 78 of the chamber 72. The piston 74 moves between a first position corresponding to a low pressure drop across the filter element 14 corresponding to a clean filter or low restriction condition, and a second position near the second end 78 of the chamber 72 corresponding to a restriction or clogged fuel filter condition within the separator.

Figure 3:
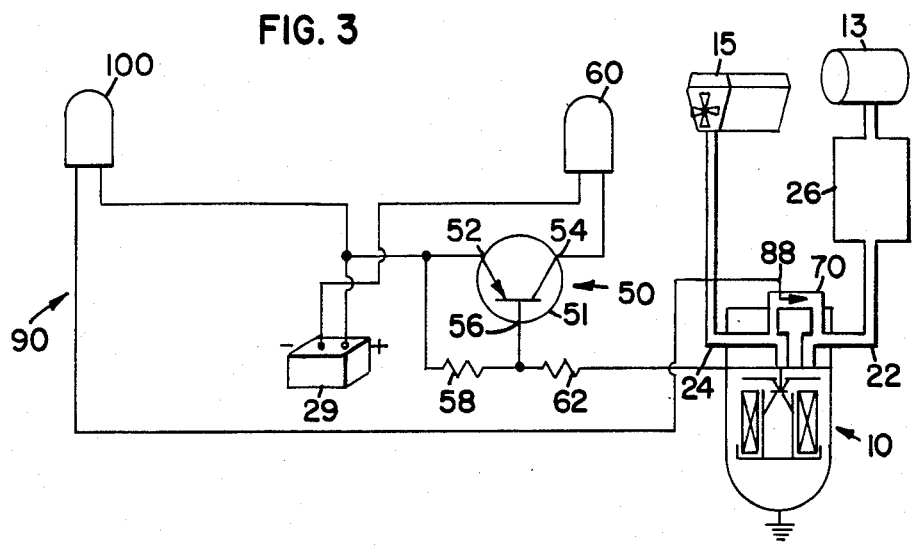
FIG. 3 is a schematic view of the wiring incorporated in an optional embodiment of the present invention.

The circuitry employed by the present invention includes a solid state transistor wired to provide electrical potential to the separated water-detecting circuit 50. Current is also provided to the restricted filter-detecting circuit 70. See FIG. 3. In both cases the detection of the condition monitored, i.e., collection of a predetermined amount of separated water or a restricted fuel filter element is made by a current flow through one of the circuits. An indication of such condition is made known to the operator by a lamp or light which indicates the detected condition. For example, FIG. 3 illustrates schematically the separator 10 with circuitry 50 for detecting a predetermined level of accumulated water, and optional circuitry 90 for detecting a restricted fuel filter element 14. Circuit 90 is found generally to the left of battery 29 and circuitry 50 is found generally to the right of the battery 29 in FIG. 3.

In reference now to FIG. 2, which illustrates schematically the wiring of the preferred embodiment, the first circuit 50 contains a transistor 51 having an emitter 52 and collector 54 and a base 56. A first resistor 58 and a second resistor 62 of approximately 1000 ohms and 900 ohms, respectively. With this configuration, an electrical potential is generally provided to the filter element 14 as described above, but current does not generally flow through the first circuit 50 unless water has accumulated within the separator to a sufficient level to allow discharge between the filter element 14 and the housing 18. Should discharge occur, lamp 60 will be illuminated as the first transistor 51 will switch a portion of the current to lamp 60. The resistors 58 and 62 respectively bias the transistor 51 so that in the presence of a conductive material between the filter element 14 and the housing 18, current will flow through the lamp 60. Conversely, in the absence of a conductive material in the reservoir, no current will flow through the lamp.

Similarly, the optional second circuit 90 is useful for detecting a restricted fuel filter element 14. Circuitry is provided which allows current to pass through lamp 100 when the pressure drop across the filter causes pressure drop detector 70 to be electrically conductive.

It is expected that satisfactory results can be achieved with the transistor of circuit 50 being of the P-N-P type and the first resistor being of approximately 1000 ohms, with the second resistor being of approximately 900 ohms, respectively. It is expected that light-emitting diodes or LED's will function satisfactorily for the first and second lamps 60 and 100 respectively. Obviously, many minor modifications including the substitution of nonsolid state components will be obvious to one skilled in the art to achieve the desired results of the sample illustrative circuitry shown.

A number of characteristics and advantages of the invention have been set forth together with the structure and operation of the preferred embodiment of the fuel-water separator. Novel features thereof are pointed out in the following claims. The above disclosure is merely illustrative, and changes may be made in detail with respect to size, shape and structural arrangement within the principles of the invention to the full extent intended by the broad general meaning of the terms expressed in the claims.

What is claimed is:

1. A fuel-water separator having a spin-on filter cartridge, said cartridge having a filter element attached at a first and a second surface within an electrically grounded housing, said housing including a separated water reservoir, said separator comprising:
   means supplying an electrical potential from a power source to said filter element;
   means for insulating said filter element from said housing, said insulating means located at said first and said second surfaces of attachment of said filter element to said housing;
   means indicating a current flow through separated water within said reservoir between said filter and said housing;
   a head, including means for supplying a mixture of fuel and water into said separator, upstream from said filter element;
   means for discharging separated fuel from said separator downstream from said filter element, said head threadably engaging said spin-on filter cartridge, said discharging means including a passageway having an electrical contact affixedly suspended within said passageway, said contact insulated from said head and electrically connected to said power source; and
   means for electrically connecting said filter element and said electrical contact when said filter cartridge is threadably engaged to said head, said electrically connecting means including a spring arm having a contact point, said arm affixed to said filter element near said first surface of attachment of said filter element to said housing, said spring arm extending into said passageway and contacting said electrical contact.

2. The fuel-water separator as in claim 1 wherein:
   said filter element includes a hydrophobically treated paper filter member of generally cylindrical shape, having a perforated, electrically conductive inner sleeve having opposite ends and passing axially through said paper filter member; and a pair of electrically conductive end plates each of said end plates affixed to said opposite ends of said sleeve in an electrically conductive manner; and
   said spring arm contact point is affixed in an electrically conductive manner to said inner sleeve.

3. The fuel-water separator as in claim 1 for use with a fuel pump, further comprising:
   means detecting a vacuum or pressure drop across said filter element, from upstream said filter element, to downstream said filter element, said means detecting a pressure drop includes a chamber having first and second ends, said first end in pressure communication with fuel upstream of said filter element, said second end in pressure communication with fuel downstream of said filter element;

a piston slidably received within said chamber, said piston having first and second faces, said first face toward said first end of said chamber and said second face toward said second end of said chamber; and means biasing said piston toward said first end of said chamber, a predetermined movement of said piston within said chamber triggering said indicated means.

4. The fuel-water separator as in claim 3 further comprising:

means providing an electrical potential from said power source through a second circuit to a touch point located within said chamber near said second end, said touch point insulated from said chamber and positioned to make electrical contact with said piston, when said piston is located near said second end of said chamber; and means grounding said piston, so that a current flows through said second circuit when said piston makes electrical contact with said touch point; said pressure drop indicating means including a second indicator lamp located within said second circuit.

5. A fuel-water separator for use with a fuel pump, said separator having a spin-on filter cartridge, said cartridge having a filter element attached at a first and second surface within a housing, said housing including a separated water reservoir, said separator comprising:
 (a) means supplying an electrical potential from a power source to said filter element;
 (b) means for insulating said filter element from said housing, said insulating means located at said point of attachment of said filter element to said housing;
 (c) means indicating a current flow through separated water within said reservoir between said filter element and said housing, detecting a predetermined level of separated water within said reservoir;
 (d) means detecting a pressure drop across said filter element, from upstream said filter element, to downstream said filter element; comprising:
  (i) a chamber having first and second ends, said first end in pressure communication with fuel upstream of said filter element, said second end in pressure communication with fuel downstream of said filter element;
  (ii) a piston slidably received within said chamber, said piston having first and second ends, said first end facing toward said first end of said chamber and said second end facing toward said second end of said chamber;
  (iii) means biasing said piston toward said first end of said chamber;
 (e) means indicating a predetermined pressure drop across said filter element; comprising:
  (i) means providing an electrical potential from said power source through a second circuit to a touch point located within said chamber near said second end, said touch point being insulated from said chamber and positioned to make electrical contact with said piston, when said piston is located near said second end of said chamber; and
  (ii) means grounding said piston, so that a current flows through said second circuit when said piston makes electrical contact with said touch point; said pressure drop indicating means including a second indicator lamp located within said second circuit distant from said separator.

6. A fuel-water separator having a spin-on filter cartridge, said cartridge having a filter element attached at a first and a second surface within a housing, said housing including a separated water reservoir, said separator comprising:

means supplying an electrical potential from a power source to said filter element;

means for insulating said filter element from said housing, said insulating means located at said first and second surfaces of attachment of said filter element to said housing;

means indicating a current flow through said reservoir between said filter and said housing;

a head, including means for supplying a mixture of fuel and water into said separator, upstream from said filter element;

means for discharging separated fuel from said separator downstream from said filter element, said head threadably engaging said spin-on filter cartridge, said discharging means including a passageway having an electrical contact suspended within said passageway, said contact insulated from said head and electrically connected to said power source;

a spring arm contact point affixed to said filter element near said first surface of attachment of said filter element to said housing, and extending, into said passageway and electrically contacting said contact point when said filter cartridge is threadably engaged to said head;

wherein said filter element includes a hydrophobically treated paper filter member of generally cylindrical shape, having a perforated, electrically conductive inner sleeves having opposite ends and passing axially through said paper filter member; and a pair of electrically conductive end plates each of said end plates affixed to said opposite ends of said sleeve in an electrically conductive manner; and said spring arm contact point being affixed in an electrically conductive manner to said inner sleeve.

7. A separator comprising a head and a spin on filter cartridge, and a means for separating water and contaminants from a fuel stream;

said cartridge having a filter element attached within an electrically conductive housing, said housing in electrical contact with said head;

said head having an inlet and an outlet, said inlet leading fuel to said filter element and said outlet leading separated fuel from said filter;

said head being in electrical contact with the low voltage side of a power source having high and low voltage sides;

means electrically insulating said filter element from said separator;

means electrically connecting said filter element with said high voltage side of said power source;

said housing including a separated water reservoir located within said housing;

means detecting a predetermined level of separated water within said reservoir;

means indicating said predetermined level of separated water, said indicating means including a current flow indicator, said indicator indicating a current flow through said reservoir between said filter element and said housing;

means indicating a predetermined pressure drop across said head from said upstream side of said filter element to said downstream side for indicating a restricted flow condition of said filter element;

said pressure drop indication means including a vacuum detector device with a chamber, said chamber being in pressure communication with both said inlet and said outlet of said head;

a piston slidably received within said chamber and movable between a first position and a second position responsive to said pressure drop across said filter element; and a pressure drop indicating means indicating a restricted flow condition of said filter element.

8. The separator as in claim 7, wherein:

said pressure drop indicating means includes means providing an electrical potential from said power source through a second circuit to a touch point located within said chamber near said second end, said touch point being insulated from said chamber and positioned to make electrical contact with said piston, when said piston is located near said second end of said chamber; and means grounding said piston so that a current flows through said second circuit when said piston makes electrical contact with said touch point;

said pressure drop indicating means including a second indicator lamp located within said second circuit.

* * * * *

UNITED STATES PATENT AND TRADEMARK OFFICE
CERTIFICATE OF CORRECTION

PATENT NO. : 4,512,882

DATED : April 23, 1985

INVENTOR(S) : Paul M. Fischer et al.

It is certified that error appears in the above-identified patent and that said Letters Patent is hereby corrected as shown below:

Column 1, line 39, "fill" should be --full--.
Claim 6, line 36, "sleeves" should be --sleeve--.

Signed and Sealed this

Fifteenth Day of October 1985

[SEAL]

Attest:

DONALD J. QUIGG

Attesting Officer

Commissioner of Patents and Trademarks—Designate